(12) United States Patent
Mazzurco

(10) Patent No.: US 6,915,078 B1
(45) Date of Patent: Jul. 5, 2005

(54) OPTICAL FRAME FORMAT

(75) Inventor: Anthony Mazzurco, Plano, TX (US)

(73) Assignee: Alcatel, Paris (FR)

( * ) Notice: Subject to any disclaimer, the term of this patent is extended or adjusted under 35 U.S.C. 154(b) by 561 days.

(21) Appl. No.: 09/638,941

(22) Filed: Aug. 15, 2000

(51) Int. Cl.[7] .............................................. H04J 14/00
(52) U.S. Cl. ............................ 398/50; 398/51; 398/54; 398/56; 398/49; 370/471; 370/474
(58) Field of Search ................................ 359/117, 128, 359/139; 385/17; 398/50–51, 54, 56, 48–49; 370/471, 474

(56) References Cited

U.S. PATENT DOCUMENTS

| | | | | |
|---|---|---|---|---|
| 5,091,905 A | * | 2/1992 | Amada ........................ | 370/415 |
| 5,303,078 A | * | 4/1994 | Brackett et al. .............. | 398/51 |
| 5,754,320 A | * | 5/1998 | Watanabe et al. ........... | 359/117 |
| 6,362,905 B1 | * | 3/2002 | Fukashiro et al. .......... | 359/128 |
| 6,477,291 B1 | * | 11/2002 | Ramadas ...................... | 385/17 |
| 6,522,803 B1 | * | 2/2003 | Nakajima et al. ............. | 385/24 |
| 6,529,300 B1 | * | 3/2003 | Milton et al. ................. | 398/59 |
| 6,542,268 B1 | * | 4/2003 | Rotolo et al. ............... | 359/128 |
| 2004/0165816 A1 | * | 8/2004 | Oikawa et al. ............... | 385/17 |

\* cited by examiner

*Primary Examiner*—Kinfe-Michael Negash
(74) *Attorney, Agent, or Firm*—Anderson, Levine & Lintel; Jessica W. Smith; V. Lawrence Sewell

(57) ABSTRACT

An optical cross-connect switch (12) includes and optical matrix 14 for passing optical communication data between an origination I/O port (20) and a destination I/O port (22). Control information is passes between the origination I/O port (20) and the destination I/O port (22) in transport frames 24. The transport frames include multiple framing bytes indicative of the start of a frame (24) and stuff bytes at regular intervals to ensure adequate bit transitions in the control information data stream. Payload bytes carrying control information are positioned between stuff bytes. The stuff bytes have different bit values from the framing bytes in multiple bit positions to allow false framing only if there are multiple bit errors in the stuff frame.

23 Claims, 3 Drawing Sheets

24

| 01010101 (FRAMING) | 01010101 (FRAMING) | 01010101 (FRAMING) |
|---|---|---|
| PAYLOAD | PAYLOAD | 00110011 (STUFF) |
| PAYLOAD | PAYLOAD | 00110011 (STUFF) |
| PAYLOAD | PAYLOAD | 00110011 (STUFF) |
| PAYLOAD | PAYLOAD | 00110011 (STUFF) |
| PAYLOAD | PAYLOAD | 00110011 (STUFF) |
| PAYLOAD | PAYLOAD | 00110011 (STUFF) |
| PAYLOAD | PAYLOAD | 00110011 (STUFF) |
| PAYLOAD | PAYLOAD | 00110011 (STUFF) |
| PAYLOAD | PAYLOAD | 00110011 (STUFF) |
| PAYLOAD | BIP-4/0101 | 00110011 (STUFF) |
| ⋮ | ⋮ | ⋮ |
| 01010101 (FRAMING) | 01010101 (FRAMING) | 01010101 (FRAMING) |
| PAYLOAD | PAYLOAD | 00110011 (STUFF) |
| PAYLOAD | PAYLOAD | 00110011 (STUFF) |
| PAYLOAD | PAYLOAD | 00110011 (STUFF) |
| PAYLOAD | PAYLOAD | 00110011 (STUFF) |
| PAYLOAD | PAYLOAD | 00110011 (STUFF) |
| PAYLOAD | PAYLOAD | 00110011 (STUFF) |
| PAYLOAD | PAYLOAD | 00110011 (STUFF) |
| PAYLOAD | PAYLOAD | 00110011 (STUFF) |
| PAYLOAD | PAYLOAD | 00110011 (STUFF) |
| PAYLOAD | BIP-4/0101 | 00110011 (STUFF) |

*FIG. 4*

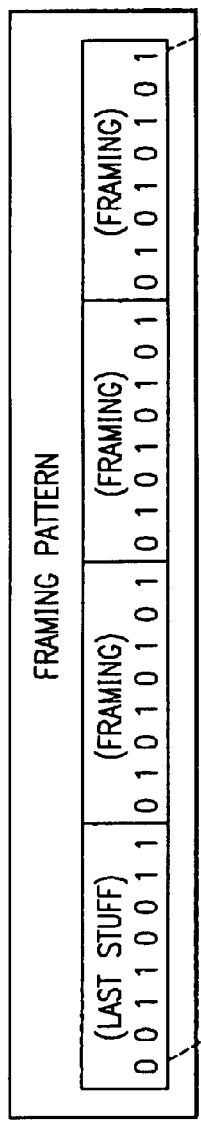

OPTICAL FRAME FORMAT

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to telecommunications using optical fibers.

2. Description of the Related Art

Cross-connect switches are used to provide switching between long haul and other communication lines to allow service providers easy reconfiguration of connections through their network. Traditionally, cross-connect switches operated on the electrical domain, even if the cross-connect switch was handling optical (e.g. SONET) traffic.

Today, communications technology is providing higher data rates carried in optical channels. Accordingly, a new optical layer is evolving to manage the optical channels. In order to provide cross-connect capabilities, as well as other features that have been available at other network layers, optical cross-connect switches are under development. These cross-connect switches will provide signal routing in the optical domain without conversion to electrical signals in order to provide transparency to the signal's timing and to eliminate the cost of converting to and handling very high-speed electrical signals.

One important function of all cross-connect switches involves inspecting the data stream of a channel to ensure that there are no errors in the cross-connected signals due to misconnections between ports. Normally, in an electrical domain, a few bytes of data that uniquely identifies the origination port are added into reserved data fields of the communications data stream by the originating I/O port of the cross-connect switch. These identification bytes are checked at the destination I/O port to ensure that the connection through the cross-connect switch was properly implemented.

Once in the optical domain, however, adding data to the received communications data stream would require a translation of the optical data stream into an electrical data stream to add the port identification information, with a second translation of the electrical data stream into an optical data stream. Converting signals to an electrical format in order to add the identification bits is undesirable because of the expense of the conversion circuitry.

Therefore, a need has arisen for an inexpensive method of ensuring the validity of connections through an optical matrix without conversion of the communications data stream into an electrical data stream.

BRIEF SUMMARY OF THE INVENTION

In the present invention, an optical cross-connect switch comprises a plurality of input/output ports for passing a data stream including one or more communication channels on an optical fiber, an optical matrix for forming an optical path for passing the data stream between an originating input/output port and a destination output port, and circuitry for modulating a control channel onto the data stream-prior to entering the optical-matrix. The control channel includes data formatted into frames, where each frame comprises n framing units, one or more sets of m payload units and stuff units, where m is less than n and the stuff units are different from the framing units in at least one bit position.

The framing protocol of the present invention provides for a way to transport control information through an optical matrix by modulating a transport channel over the communication channel. The transport frame ensures that bit transitions for clock recovery are provided throughout the frame by the inclusion of framing bytes and stuff bytes with known transitions. Thus, other expensive techniques, such as scrambling, can be avoided. Further, the framing pattern for detecting the start of a frame can be a combination of stuff and pattern bits that require multiple bit errors in order to falsely frame. Framing can be acquired very quickly, typically in less than a millisecond.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 4 shows the format of the transport frame used to convey control information between and originating I/O port and a destination I/O port; and FIG. 5 illustrates a process for acquiring the start of a frame.

DETAILED DESCRIPTION OF THE INVENTION

The present invention is best understood in relation to FIGS. 1–5 of the drawings, like numerals being used for like elements of the various drawings.

Figure 1:
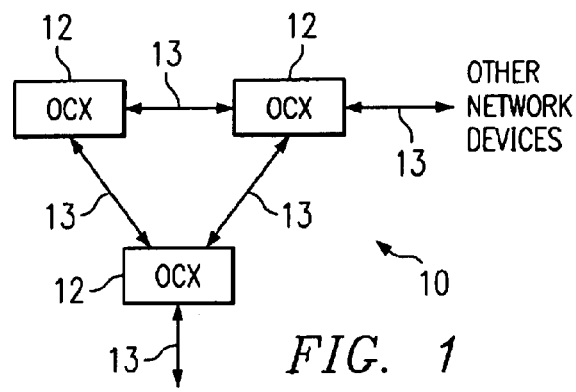
FIG. 1 is a block diagram of the telecommunications system.

FIG. 1 illustrates a very simplified block diagram of a portion of a communication network 10. In this figure, cross-connect switches (shown in FIG. 1 as optical cross-connects or "OCXs" 12) couple communication lines 13 (optical fibers, in this case).

The cross-connect switches 12 provide flexibility in routing lines. As lines 13 are added or removed, connections between lines 13 can be re-provisioned. Also, the cross-connects switches 12 provide the ability to select between two or more redundant channels, in the event that communications over one of the lines is interrupted or degraded.

Figure 2:
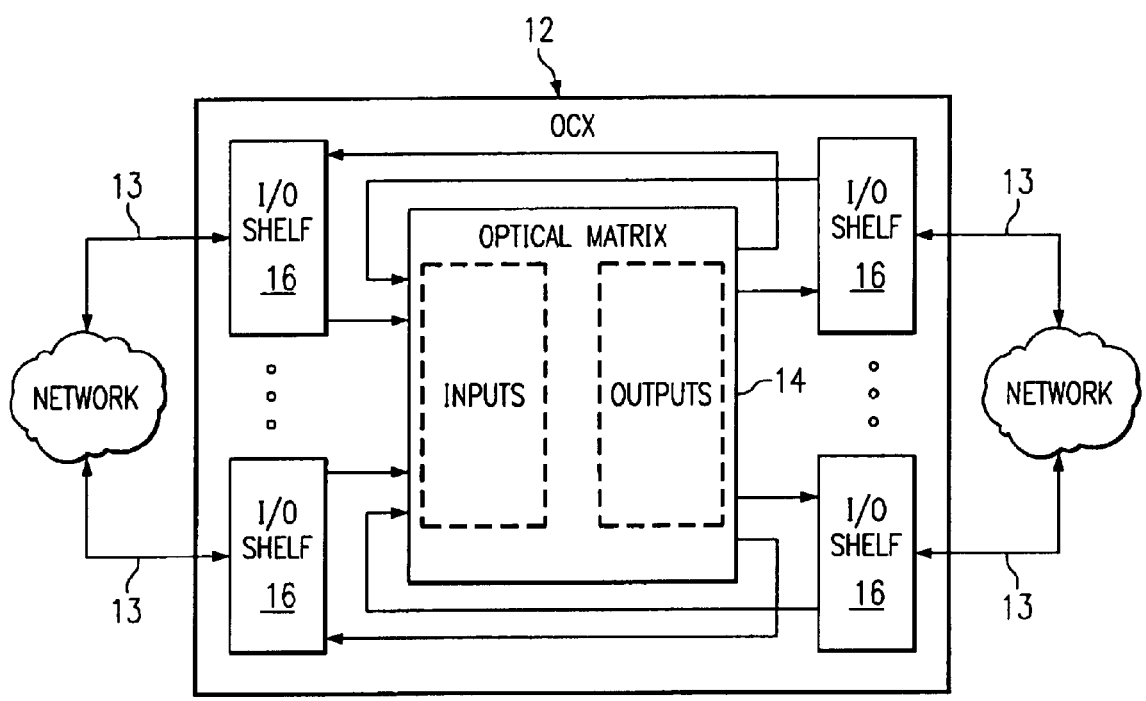
FIG. 2 is a block diagram of a cross-connect switch.

FIG. 2 illustrates a cross-connect switch architecture using an optical matrix 14. Optical matrix 14 has multiple inputs and multiple outputs. Preferably, the optical-matrix 14 is non-blocking, i.e., optical matrix 14 has the ability to switch any of the matrix inputs to any of the matrix outputs regardless of the current cross-connection configuration. The inputs and outputs of the matrix are coupled to a plurality of I/O shelves 16, each shelf providing multiple input/output ports for interfacing with lines 13 from the network 10.

In operation, control information including port identification information as well as other information, is modulated on a wavelength different than the wavelength(s) used by the optical data stream from the network and optically multiplexed with the optical data stream from the network in each originating I/O port in shelves 16. The control information is formatted in "transport frames" described in greater detail hereinbelow. The transport frame is recovered by the destination I/O port to verify the correctness of the path through optical matrix 14. The transport frame can be filtered from the output of the destination I/O port, since they are modulated on different wavelengths.

Figure 3:
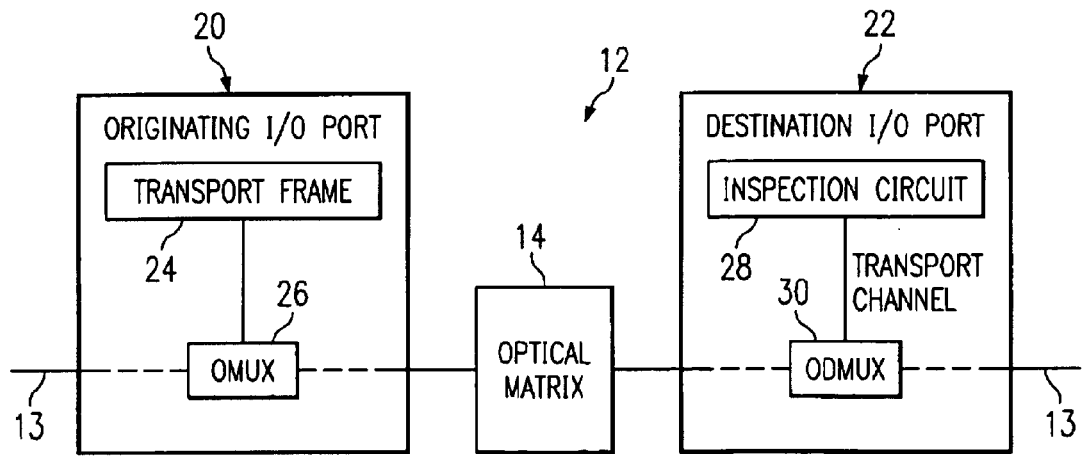
FIG. 3 is a partial block diagram of a cross-connect switch with circuitry for passing control information.

FIG. 3 illustrates a more detailed view of the optical cross connect 12. Originating I/O port 20 receives an optical fiber 13 carrying one or more communication channels. Optical matrix 14 passes the communication data from this fiber to a desired destination I/O port 22. Control information formatted in a transport frame 24, described in greater detail in connection with FIG. 4, is modulated onto a predetermined wavelength and optically multiplexed with the optical data signal at the originating port 20 using an optical multiplexer 26. The transport frame is modulated at a different frequency than the communication channel(s). The transport frame includes information identifying the originating I/O port 20 as well as any other desirable information. The communication data and control information is passed to the destination I/O port 22 via the optical matrix 14. The destination I/O port 22 includes inspection circuit 28 and optical demultiplexer 30. Optical demultiplexer 30 demodulates the transport frame information and translates it into electrical signals. Inspection circuit 28 verifies that the information is coming from the correct originating I/O port, based upon the information in the demodulated transport frame.

In operation, the transport frame 24 includes three different classes of information. The first class of information is framing information. This information identifies the start of the frame. The second class of information is "stuffing" information. The stuffing information ensures that there are enough bit transitions to prevent clock recovery circuits from losing their lock on the data. The third class of information is the payload information, which includes any type of information such as originating I/O port identification, which is desirable to pass from the originating I/O port to the destination I/O port.

In the preferred embodiment, the framing information and the stuffing information are designed to provide fast and unambiguous framing, with a tolerance for bit errors. In particular, it is desirable that bit errors in the framing and stuffing information do not cause false framing. Further, if false framing occurs, it is desirable that accurate framing is achieved as soon as possible.

It is assumed that the bit rate for transport channel modulated on fiber 13 is 2 Mbps (megabits per second). For the 33-byte frame shown in connection with FIG. 4, that would result in a period of 132 microseconds per frame. This signal can be modulated with a 1310 nm laser, which is relatively inexpensive. In the preferred embodiment, the transport frame 24 is transmitted without scrambling, which would require additional expensive circuitry.

FIG. 4 illustrates a 33-byte transport frame. The frame is organized as three framing bytes to start the frame, followed by groups of three bytes (two payload bytes followed by a stuff byte). Each of the framing bytes is set to "01010101" and each stuff byte is set to "00110011". The last payload byte is a four-bit BIP-4 (or other) error correction byte followed by a predetermined bit pattern (in this case "0101"). This frame is continually repeated onto a transport channel modulated at a predetermined frequency that will not interfere with the communication channels.

Accordingly, nineteen bytes of each frame are available for data, such as the originating I/O port identifier. After each two byes of data, a stuff byte ensures data transitions so that clock recovery lock is not lost on the data. The stuff bytes also are set to values that make it impossible for payload data to imitate the framing pattern without multiple bit errors.

If more payload data is desired between stuff bytes, the number of framing bytes to indicate the start of the frame could be increased. For example, in a system where five framing bytes are used- to indicate the start of the frame, four payload bytes could exist between stuff bits. In general, for a frame using n bytes, n–1 payload bytes can exist prior to a stuff byte. Increasing the number of payload bytes between stuff bytes will not affect false framing (so long as the consecutive framing bytes is similarly increased), however, it could result in a longer time period between bit transitions, which can affect clock recovery.

FIG. 5 illustrates detection of the start of the transport packet frame. In order to detect the start of the frame, a framing pattern of one stuff byte (the last byte of the previous frame) followed by three framing bytes (for the illustrated embodiment) is detected in the transport channel. An important aspect of the embodiment of the transport packet shown in FIG. 4 is that it is very difficult for false framing to occur. Assuming that a payload byte could have any value, and thus both payload bytes could have the same value as a framing byte, it would be necessary for the following stuff byte to have, at a minimum, four bit errors in order to mimic the final framing byte necessary for a frame detection. The bit pattern after the BIP-4 correction field prevents frames from matching at a half-byte interval.

In the worst-case scenario (assuming no bit errors), a framing pattern will be detected within thirty-six bytes (0.144 milliseconds). Once an "in frame" condition (one framing pattern with no errors) is detected, the inspection circuitry will continue to monitor the framing information at its expected locations (the last-stuff byte of the frame and the next consecutive three framing bytes). If two or more consecutive frames are found to have three or more errors in their framing patterns, an "out of frame" condition is declared and the inspection circuit 28 begins looking for a valid frame again. Other criteria may be established based on expected error rates.

The framing format described above provides a high probability of finding a frame in at least thirty-six bytes, and provides an extremely low probability of false framing. The possibility that false framing occurs for more than one frame is almost non-existent.

Using an error rate ($P_E$) of $1\times10^{-6}$ errors/bit (one error in million bits on the transport channel), which would be an extraordinarily high error rate, the probability that a frame is not found within thirty-six bytes is equal to:

$$P\text{(framing pattern error)}=1-(1-P_E)^{32}=1-(1-10^{-6})^{32}3.2\times10^{-5}$$

In other words, a random error that affects the framing pattern could occur once every 32,000 frames. The probability of errors causing a missed frame in two consecutive frames would equal:

$$P\text{(two consecutive framing errors)}=(3.2\times10^{-5})^2=1.024\times10^{-9}$$

Thus, missing an in-frame condition in two consecutive frames would occur once in every billion attempts.

The probability of erroneous framing, i.e., a condition where payload bytes are set to the same value as framing bytes, and four errors occur in the following stuff byte, in specific bit positions. In the worst case, there are only two bit pattern scenarios that would allow the bit patterns to cause a framing error (in the illustrated embodiment where the errors occur in the stuff byte to mimic a framing byte, the errors would need to occur either in all of the odd bit positions or all of the even bit positions). The probability of such an error is:

$$P(\text{One byte with four errors}) = P_E^4 \times (1-P_E)^4 \times 2 \text{ combinations} = (10^{-6})^4 \times (1-10^{-6})^4 \times 2 = 2 \times 10^{-24}$$

The probability of sustaining this for two frames is:

$$(2 \times 10^{-24})^2 = 4 \times 10^{-48}$$

Thus, the probability of false framing occurring over two consecutive frames is almost non-existent. The probability of false framing continuing more than two frames diminishes even further.

According, the framing protocol described above provides for a way to transport control information through an optical matrix by modulating a transport channel over the communication channel. The transport frame ensures that bit transitions are provided throughout the frame by the inclusion of framing bytes and stuff bytes with known transitions. Thus, other expensive techniques, such as scrambling, can be avoided. Further, the framing pattern for detecting the start of a frame is a combination of stuff and pattern bits that require multiple bit errors in order to falsely frame. An in-frame condition is highly likely to occur in less than a millisecond.

Many variations could be made to the bit patterns for the stuff and framing bytes. Exchanging the stuff and byte patterns (i.e., the stuff byte is set to 01010101 and the framing byte is set to 00110011), will have the same benefits as described above. Similarly, exchanging the "1s" and "0s" in the patterns, (i.e., the stuff byte is set to 11001100 and/or the framing byte is set to 10101010), will also retain the same benefits.

Other variations such as setting the framing byte to 01011010 and or the stuff byte to 00111100 would retain the benefits of the illustrated embodiment. The important factors are (1) that the stuff byte differs from the packing byte in multiple bit positions and (2) that at least the stuff byte, and preferably both the stuff byte and framing byte, have multiple bit transitions to ensure that clock recovery circuits do not lose lock.

The present invention has also been described in connection with using bytes (eight bits) as the standard unit size. The invention could be easily adjusted to accommodate any data unit size.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. An optical cross-connect switch comprising:
   a plurality of input/output ports for passing a data stream including one or more communication channels on an optical fiber;
   an optical matrix for forming an optical path for passing said data stream between an originating input/output port and a destination output port; and
   circuitry for multiplexing a control channel with said data stream prior to entering said optical matrix, said control channel including data formatted into frames, where each frame comprises:
   n framing units;
   one or more sets of m payload units and stuff units, where m is less than n and said stuff units are different from said framing units in at least one bit position; and
   wherein said one or more communications channels are modulated at respective wavelengths and said control channel is modulated at a wavelength different from said one or more respective wavelengths.

2. The optical cross-connect switch of claim 1 wherein m=n−1.

3. The optical cross-connect switch of claim 1 wherein one of said framing units and said stuff units has a bit pattern of alternating "0"s and "1"s.

4. The optical cross-connect switch of claim 3 wherein the other of said framing units and said stuff units has a bit pattern of alternating "00"s and "11"s.

5. The optical cross-connect switch of claim 1 wherein one of said payload units of the control channel includes information indicative of the originating input/output port.

6. An optical cross-connect switch comprising:
   a plurality of input/output ports for passing a data stream including one or more communication channels on an optical fiber;
   an optical matrix for forming an optical path for passing said data stream between an originating input/output port and a destination output port; and
   circuitry for multiplexing a control channel with said data stream prior to entering said optical matrix, said control channel including data formatted into frames, where each frame comprises:
   n framing units;
   one or more sets of m payload units and stuff units, where m is less than n and said stuff units are different from said framing units in at least one bit position and one of said payload units contains error correction data.

7. An optical cross-connect switch comprising:
   a plurality of input/output ports for passing a data stream including one or more communication channels on an optical fiber;
   an optical matrix for forming an optical path for passing said data stream between an originating input/output port and a destination output port; and
   circuitry for multiplexing a control channel with said data stream prior to entering said optical matrix, said control channel including data formatted into frames, where each frame comprises:
   n framing units;
   one or more sets of m payload units and stuff units, where m is less than n and said stuff units are different from said framing units in at least one bit position and said stuff units have multiple data transitions between adjacent bit positions.

8. An optical cross-connect switch comprising:
   a plurality of input/output ports for passing a data stream including one or more communication channels on an optical fiber;
   an optical matrix for forming an optical path for passing said data stream between an originating input/output port and a destination output port; and
   circuitry for multiplexing a control channel with said data stream prior to entering said optical matrix, said control channel including data formatted into frames, where each frame comprises:

n framing units;

one or more sets of m payload units and stuff units, where m is less than n and said stuff units are different from said framing units in at least one bit position; and circuitry in said input/output ports for detecting a start of frame condition by matching a pattern of one stuff unit followed by n framing units.

9. A method of controlling an optical cross-connect switch comprising the steps of:

forming an optical path for passing said data stream between an originating input/output port and a destination output port through an optical matrix;

modulating one or more control channels onto said data stream prior to entering said optical matrix, said control channel including data formatted into frames, where each frame comprises n framing units and one or more sets of m payload units and stuff units, where m is less than n and said stuff units are different from said framing units in at least one bit position; and wherein said one or more communications channels are modulated at respective wavelengths and said control channel is modulated at a wavelength different from said one or more respective wavelengths.

10. The method of claim 9 wherein m=n−1.

11. The method of claim 9 wherein one of said framing units and said stuff units has a bit pattern of alternating "0"s and "1"s.

12. The method of claim 11 wherein the other of said framing units and said stuff units has a bit pattern of alternating "00"s and "11"s.

13. The method of claim 9 wherein one of said payload units of the control channel includes information indicative of the originating input/output port.

14. A method of controlling an optical cross-connect switch comprising the steps of:

forming an optical path for passing said data stream between an originating input/output port and a destination output port through an optical matrix;

modulating one or more control channels onto said data stream prior to entering said optical matrix said control channel including data formatted into frames, where each frame comprises n framing units and one or more sets of m payload units and stuff units, where m is less than n and said stuff units are different from said framing units in at least one bit position and one of said payload units contains error correction data.

15. A method of controlling an ortical cross-connect switch comprising the steps of:

forming an optical path for passing said data stream between an originating input/output port and a destination output port through an optical matrix;

modulating one or more control channels onto said data stream prior to entering said optical matrix, said control channel including data formatted into frames, where each frame comprises n framing units and one or more sets of m payload units and stuff units, where m is less than n and said stuff units are different from said framing units in at least one bit position and said stuff units have multiple data transitions between adjacent bit positions.

16. A method of controlling an optical cross-connect switch comprising the steps of:

forming an optical path for passing said data stream between an originating input/output port and a destination output port through an optical matrix;

modulating one or more control channels onto said data stream prior to entering said optical matrix, said control channel including data formatted into frames, where each frame comprises n framing units and one or more sets of m payload units and stuff units, where m is less than n and said stuff units are different from said framing units in at least one bit position; and detecting a start of frame condition by matching a pattern of one stuff unit followed by n framing units.

17. An optical cross-connect switch comprising:

a plurality of ports for receiving and transmitting data streams, wherein the data streams include one or more communication channels modulated on one or more wavelengths;

an optical matrix for forming an optical path for passing said data stream between an originating port and a destination port; and circuitry for multiplexing a control channel with said data stream prior to entering said optical matrix, wherein said control channel is modulated at a wavelength different from said one or more communication channels and includes information identifying the originating port of the data stream.

18. The optical cross-connect switch of claim 17, further comprising:

circuitry for separating the control channel from said data stream after the data stream exits the optical matrix.

19. The optical cross-connect switch of claim 17, further comprising:

circuitry for verifying an originating port of the am based on the information identifying the originating port in the control channel.

20. The optical cross-connect switch of claim 17, wherein said control channel is formatted into transport frames, and wherein each transport frame comprises:

n framing units;

one or more sets of m payload units and stuff units, where m is less than n and said stuff units are different from said framing units in at least one bit position.

21. The optical cross-connect switch of claim 20 wherein one of said payload units contains error correction data.

22. The optical cross-connect switch of claim 20 wherein said stuff units have multiple data transitions between adjacent bit positions.

23. The optical cross-connect switch of claim 20 wherein one of said framing units and said stuff units has a bit pattern of alternating "0"s and "1"s.

* * * * *